(12) United States Patent
Wu

(10) Patent No.: US 6,439,108 B1
(45) Date of Patent: Aug. 27, 2002

(54) GRILL DEVICE HAVING A SPACE ADJUSTING UNIT TO ADJUST A SPACE BETWEEN AN UPPER GRILL UNIT AND A LOWER GRILL UNIT

(75) Inventor: Tsan-Kuen Wu, Tainan Hsien (TW)

(73) Assignee: EUPA International Corporation, Las Vegas, NV (US)

( * ) Notice: Subject to any disclaimer, the term of this patent is extended or adjusted under 35 U.S.C. 154(b) by 0 days.

(21) Appl. No.: 10/105,588

(22) Filed: Mar. 25, 2002

(51) Int. Cl.[7] .......................... A47J 37/00; A47J 37/06; A47J 37/08
(52) U.S. Cl. ............................. 99/349; 99/353; 99/372; 99/375; 99/378; 99/379; 99/400; 99/425; 99/445; 99/446
(58) Field of Search .......................... 99/331–333, 349, 99/352, 353, 372–384, 400, 401, 422–425, 444–450; 219/401, 521, 524, 525, 585, 537, 386, 415, 461, 492, 494; 100/92, 305; 126/369, 20; 426/523, 520, 512

(56) References Cited

U.S. PATENT DOCUMENTS

| | | | | |
|---|---|---|---|---|
| 3,880,064 A | * | 4/1975 | Martinex ...................... 99/349 |
| 4,972,766 A | * | 11/1990 | Anetsberger ................... 99/332 |
| 5,473,976 A | * | 12/1995 | Hermansson .................. 99/349 |
| 5,531,155 A | * | 7/1996 | Pellicane et al. .............. 99/372 |
| 5,555,794 A | * | 9/1996 | Templeton et al. ............ 99/349 |
| 5,655,434 A | * | 8/1997 | Liebemann .................... 99/353 |
| 5,676,046 A | * | 10/1997 | Taber et al. ................... 99/340 |
| 5,755,150 A | * | 5/1998 | Matsumoto et al. ........... 99/372 |
| 5,771,782 A | * | 6/1998 | Taber et al. ............... 99/385 X |
| 5,802,958 A | * | 9/1998 | Hermansson .............. 99/379 X |
| 5,839,359 A | * | 11/1998 | Gardener ....................... 99/349 |
| 5,881,634 A | * | 3/1999 | Newton ..................... 99/379 X |
| 6,319,326 B1 | * | 10/2001 | Wang ........................ 99/372 X |

* cited by examiner

Primary Examiner—Timothy F. Simone
(74) Attorney, Agent, or Firm—Brinks Hofer Gilson & Lione

(57) ABSTRACT

A grill device includes a U-shaped frame that is pivoted to a lower grill unit and that has two lateral arms. An upper grill unit is disposed between and is pivoted to the lateral arms by two first pivots. A space adjusting unit includes second, third and fourth pivots, and pivotally connected first and second links. The first link is pivoted to the upper grill unit via the second pivot which is disposed frontwardly of and which extends in a direction parallel to the first pivot. The second link is pivoted to the first link and one of the lateral arms via the third and fourth pivots, respectively, which extend in directions parallel to the first pivots.

3 Claims, 3 Drawing Sheets

GRILL DEVICE HAVING A SPACE ADJUSTING UNIT TO ADJUST A SPACE BETWEEN AN UPPER GRILL UNIT AND A LOWER GRILL UNIT

CROSS REFERENCE TO RELATED APPLICATION

This application is related to U.S. patent application Ser. No. 09/952729 which is filed on Sep. 14, 2001 U.S. Pat. No. 6,363,835.

BACKGROUND OF THE INVENTION

1. Field of the Invention

The invention relates to a grill device, more particularly to a grill device which has a space adjusting unit to adjust a space between an upper grill unit and a lower grill unit.

2. Description of the Related Art

In the aforesaid co-pending application of the inventor, a grill device is disclosed to include a lower grill unit having a rear side and a lower cooking member, and a U-shaped frame that is pivoted to the rear side of the lower grill unit and that is movable relative thereto between a closed position, where the U-shaped frame is superposed on a periphery of the lower grill unit, and a position of use, where the U-shaped frame is at an angle relative to the lower grill unit. The U-shaped frame has two parallel lateral arms defining therebetween a receiving space. A horizontal upper grill unit is disposed in the receiving space, and is pivoted to the lateral arms of the U-shaped frame via two pivots so as to be turnable relative to the U-shaped frame. The upper grill unit has an upper cooking member which is electrically coupled to the lower cooking member of the lower grill unit, and cooperates with the lower grill unit to confine a cooking space therebetween. The upper grill unit includes a rectangular grill housing within which the upper cooking member is fixed and which has two lateral walls disposed inboard to and extending parallel to the lateral arms of the U-shaped frame, and two pivot holes which are respectively formed through the lateral walls and which permit extension of the pivots therethrough and a parallel relation between the upper and lower grill units when the U-shaped frame is disposed at the position of use.

SUMMARY OF THE INVENTION

The object of this invention is to provide a grill device that has a space adjusting unit to adjust a space between an upper grill unit and a lower grill unit.

Accordingly, a grill device of the present invention includes a horizontal lower grill unit, a U-shaped frame, a pair of first pivots, a horizontal upper grill unit, and a space adjusting unit. The lower grill unit has a rear side and is provided with a lower cooking member. The frame is pivoted to the rear side of the lower grill unit about a pivot axis such that the frame is turnable about the pivot axis toward and away from the lower grill unit. The frame has two parallel lateral arms defining therebetween a receiving space. The upper grill unit is disposed in the receiving space, and is pivoted to the lateral arms of the frame via the first pivots, which extend in a direction parallel to the pivot axis, so as to be turnable relative to the frame. The upper grill unit has an upper cooking member that cooperates with the lower cooking member to define a cooking space therebetween. The space adjusting unit includes second, third and fourth pivots, and pivotally connected first and second links. The first link is pivoted to the upper grill unit via the second pivot, which is disposed frontwardly of and which extends in a direction parallel to the first pivots. The second link is pivoted to the first link and one of the lateral arms via the third and fourth pivots, respectively, which extend in directions parallel to the first pivots. A positioning member is provided for positioning the lateral arms of the frame relative to the lower grill unit at an acute angle, thereby spacing the upper cooking member apart from the lower cooking member.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
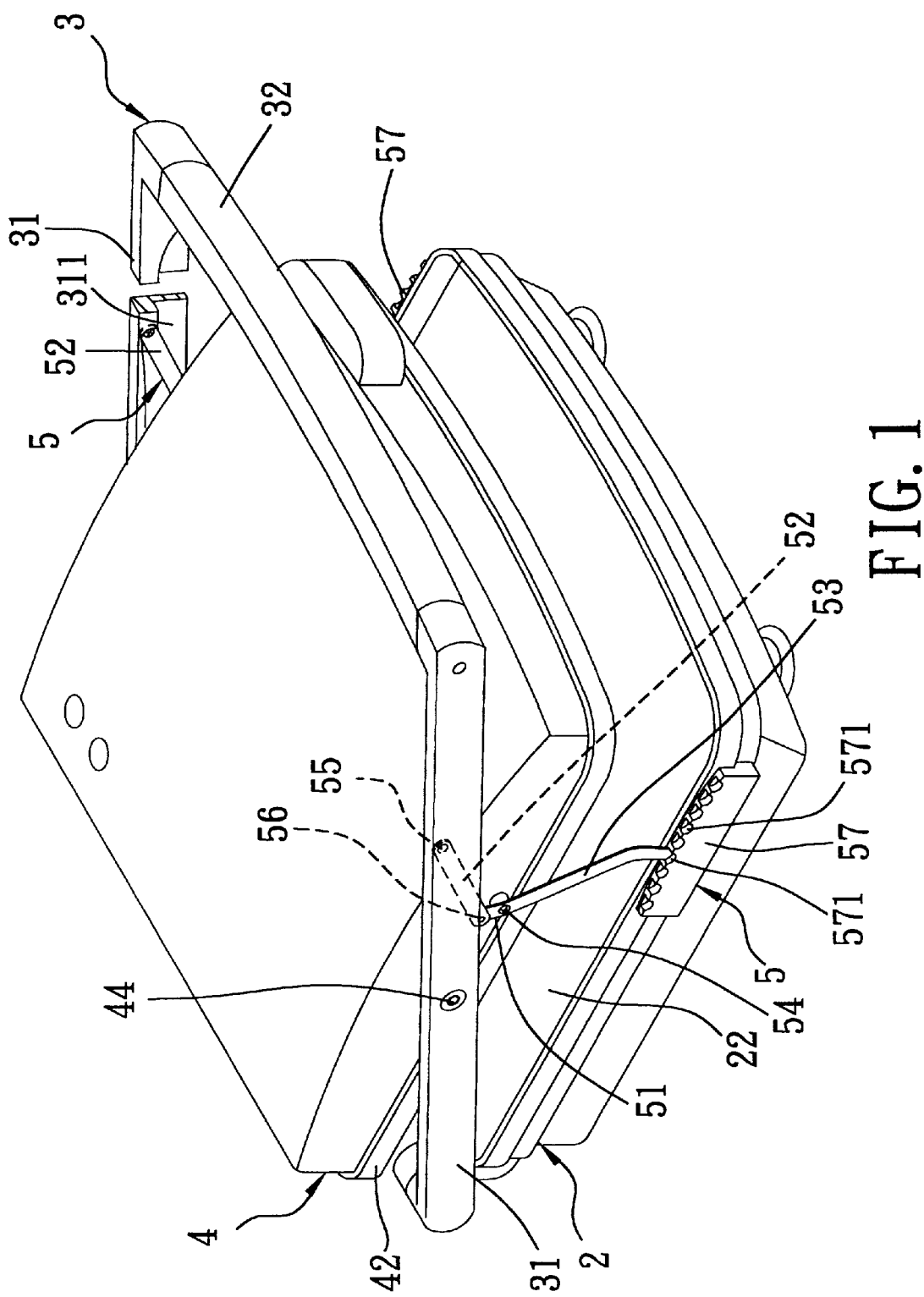
FIG. 1 is a perspective view of the preferred embodiment of a grill device of the present invention.
Figure 2:
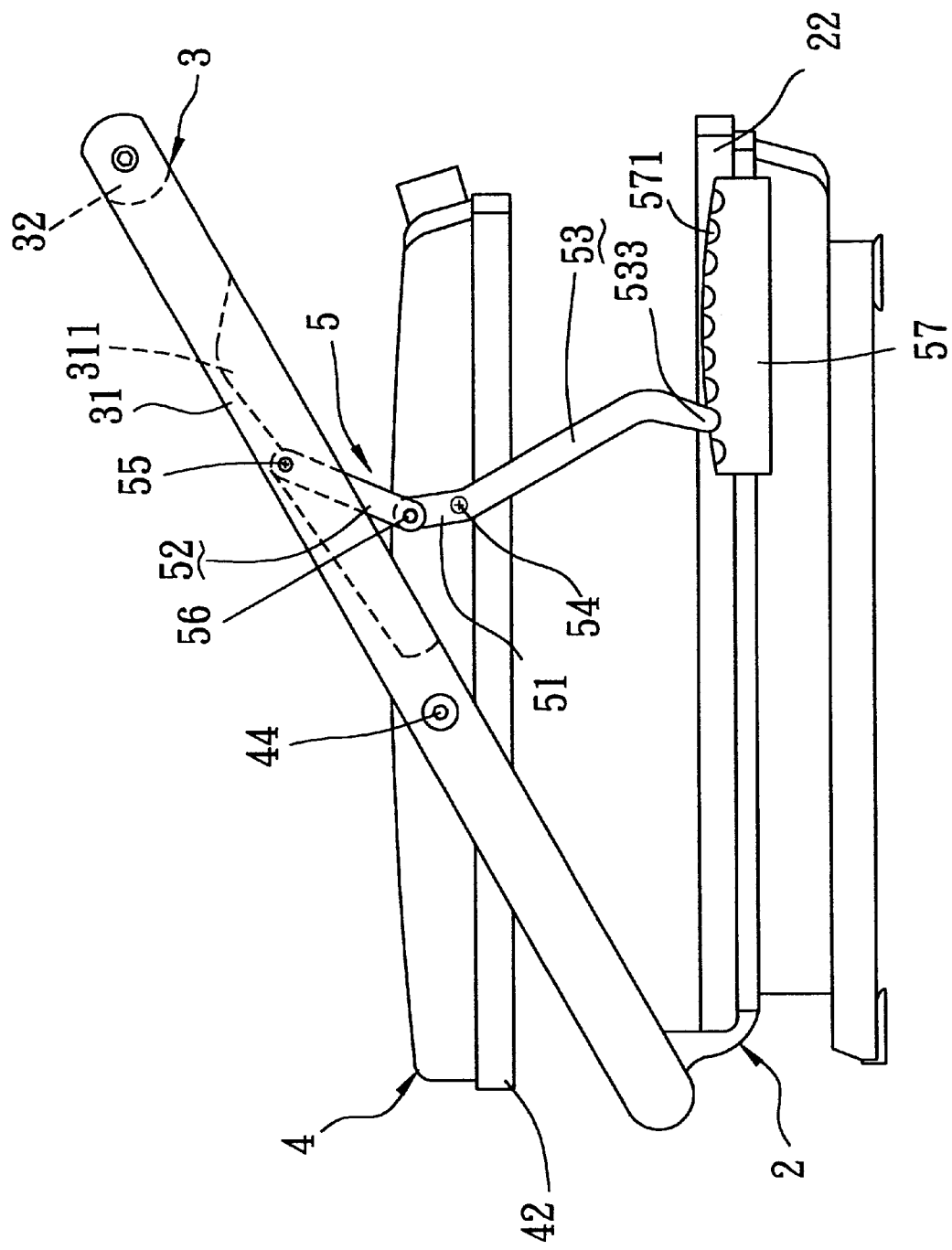
FIG. 2 is a lateral side view of the preferred embodiment, illustrating a state where a space adjusting unit is employed to adjust a space between an upper grill unit and a lower grill unit.
Figure 3:
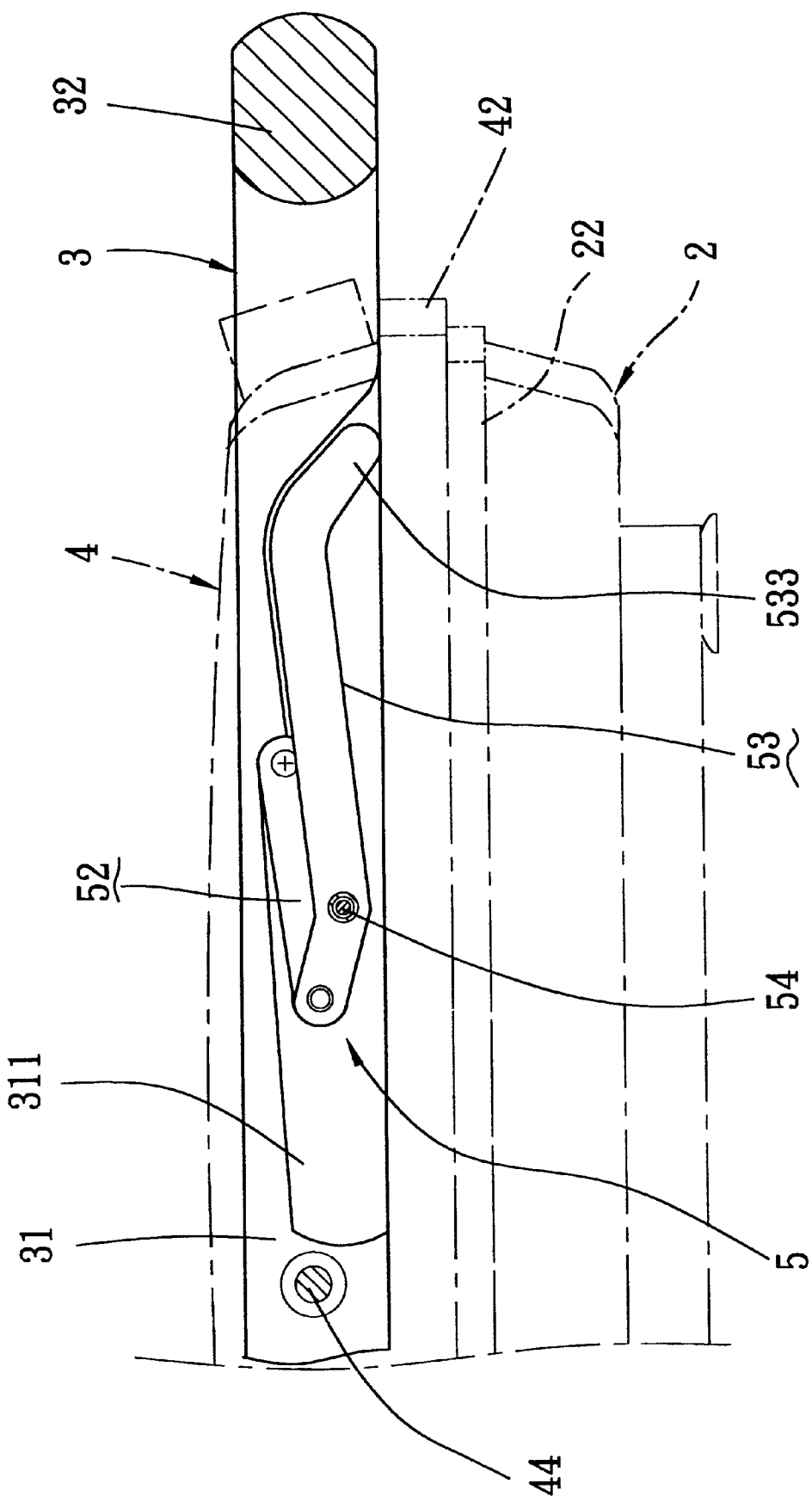
FIG. 3 is a lateral side view of the preferred embodiment, illustrating a state where the space adjusting unit is not used.

Referring to FIGS. 1 to 3, the preferred embodiment of a grill device of the present invention is shown to include a horizontal lower grill unit 2, a U-shaped frame 3, a horizontal upper grill unit 4, and two space adjusting units 5.

As illustrated, the lower grill unit 2 has a rear side and a top that is provided with a lower cooking member 22.

The frame 3 is pivoted to the rear side of the lower grill unit 2 about a pivot axis such that the frame 3 is turnable about the pivot axis toward and away from the lower grill unit 2. The frame 3 includes a transverse arm 32, and two parallel lateral arms 31 which extend from two opposite ends of the transverse arm 32 to define a receiving space therebetween.

The upper grill unit 4 is disposed in the receiving space, and is pivoted to the lateral arms 31 of the U-shaped frame 3 via two first pivots 44 which extend in a direction parallel to the pivot axis, so as to be turnable relative to the frame 3. The upper grill unit 4 has an upper cooking member 42 which is electrically coupled to the lower cooking member 22 of the lower grill unit 2, and which cooperates with the lower grill unit 2 to confine a cooking space therebetween.

Each of the space adjusting units 5 includes second, third and fourth pivots 54, 55, 56, pivotally and respectively connected to first and second links 51, 52, and a positioning member. The first link 51 is pivoted to the upper grill unit 4 via the second pivot 54 which is disposed frontwardly of and which extends in a direction parallel to the first pivots 44. The second link 52 is pivoted to the first link 51 and one of the lateral arms 31 of the frame 3 via the third and fourth pivots 55, 56, respectively, which extend in directions parallel to the first pivots 44.

The positioning member positions the lateral arms 31 of the frame 3 relative to the lower grill unit 2 at an acute angle, thereby spacing the upper cooking member 42 apart from the lower cooking member 22 in a parallel manner.

The positioning member preferably includes a spacer rod 53 and a rod-positioning seat 57. The spacer rod 53 is connected to and extends integrally from the first link 51, and has an anchored end 533. The rod-positioning seat 57 is fixed on the lower grill unit 2 outwardly of the lower cooking member 22, and is formed with a plurality of aligned anchoring grooves 571. The anchored end 533 of the spacer rod 53 is capable of extending into and being anchored in a selected one of the anchoring grooves 571 for positioning the frame 3 at the acute angle.

Each of the lateral arms 31 of the frame 3 defines a link-retention chamber 311 extending along the length thereof so as to receive the first and second links 51, 52 and the spacer rod 53 when the upper and lower cooking members 42, 22 are stacked and contact each other, as best shown in FIG. 3.

Referring again to FIG. 2, in case a relatively thick piece of meat is to be grilled between the upper and lower cooking members 42, 22, the cooking space between the upper cooking member 42 and the lower cooking member 22 can be adjusted by virtue of selecting a desired one of the anchoring grooves 571 to permit anchoring of the anchored end 533 of the spacer rod 53 therein. Under this condition, upper and lower grilling surfaces of the meat will be fully and properly grilled after the required grilling period.

With this invention thus explained, it is apparent that numerous modifications and variations can be made without departing from the scope and spirit of this invention. It is therefore intended that this invention be limited only as indicated in the appended claims.

I claim:

1. A grill device comprising:
    a horizontal lower grill unit having a rear side and provided with a lower cooking member;
    a U-shaped frame pivoted to said rear side of said lower grill unit about a pivot axis such that said frame is turnable about the pivot axis toward and away from said lower grill unit, said frame having two parallel lateral arms defining therebetween a receiving space;
    a pair of first pivots;
    a horizontal upper grill unit disposed in said receiving space and pivoted to said lateral arms of said frame via said first pivots, which extend in a direction parallel to the pivot axis, so as to be turnable relative to said frame, said upper grill unit having an upper cooking member that cooperates with said lower cooking member to define a cooking space therebetween; and
    a space adjusting unit including
        second, third and fourth pivots,
        pivotally connected first and second links, said first link being pivoted to said upper grill unit via said second pivot, which is disposed frontwardly of and which extends in a direction parallel to said first pivots, said second link being pivoted to said first link and one of said lateral arms via said third and fourth pivots, respectively, which extend in directions parallel to said first pivots, and
        a positioning member for positioning said lateral arms of said frame relative to said lower grill unit at an acute angle, thereby spacing said upper cooking member apart from said lower cooking member.

2. The grill device as defined in claim 1, wherein said positioning member includes a spacer rod connected to and extending integrally from said first link, and having an anchored end, and a rod-positioning seat that is fixed on said lower grill unit outwardly of said lower cooking member and that is formed with a plurality of aligned anchoring grooves, said anchored end of said spacer rod being capable of selectively extending into and being anchored in one of said anchoring grooves for positioning said frame at said acute angle.

3. The grill device as defined in claim 2, wherein said one of said lateral arms defines a link-retention chamber extending along the length thereof so as to receive said first and second links and said spacer rod when said upper and lower cooking members are stacked and contact each other.

* * * * *